United States Patent
Doemling et al.

(10) Patent No.: US 7,941,340 B2
(45) Date of Patent: May 10, 2011

(54) DECOMPILATION USED TO GENERATE DYNAMIC DATA DRIVEN ADVERTISEMENTS

(75) Inventors: Marcus Doemling, Saratoga, CA (US); Sumit Mishra, Santa Clara, CA (US); Prabhakar Goyal, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 12/242,645

(22) Filed: Sep. 30, 2008

(65) Prior Publication Data

US 2010/0082441 A1   Apr. 1, 2010

(51) Int. Cl.
*G06Q 30/00* (2006.01)
(52) U.S. Cl. .................................... 705/14.72
(58) Field of Classification Search .......... 705/14, 705/14.72; 221/2; 400/62; 435/67; 715/255, 715/713, 503, 207
See application file for complete search history.

(56) References Cited

U.S. PATENT DOCUMENTS

| | | |
|---|---|---|
| 5,717,923 A | 2/1998 | Dedrick |
| 5,933,811 A | 8/1999 | Angles et al. |
| 5,937,392 A | 8/1999 | Alberts |
| 5,948,061 A | 9/1999 | Merriman et al. |
| 6,009,410 A | 12/1999 | LeMole et al. |
| 6,026,368 A | 2/2000 | Brown et al. |
| 6,119,098 A | 9/2000 | Guyot et al. |
| 6,496,857 B1 | 12/2002 | Dustin et al. |
| 6,601,041 B1 | 7/2003 | Brown et al. |
| 6,718,515 B1 * | 4/2004 | Conner et al. ............... 715/207 |
| 6,718,551 B1 | 4/2004 | Swix et al. |
| 7,155,508 B2 | 12/2006 | Sankuratripati et al. |
| 7,181,415 B2 | 2/2007 | Blaser et al. |
| 7,194,424 B2 | 3/2007 | Greer et al. |
| 7,246,083 B2 | 7/2007 | Bibelnieks et al. |
| 7,260,783 B1 | 8/2007 | Mika |
| 7,315,983 B2 * | 1/2008 | Evans et al. .................... 715/713 |
| 7,359,952 B2 | 4/2008 | Doemling et al. |
| 7,366,996 B2 | 4/2008 | Hoyle |
| 7,373,599 B2 | 5/2008 | McElfresh et al. |
| 7,376,714 B1 | 5/2008 | Gerken |
| 2002/0112033 A1 | 8/2002 | Doemling et al. |
| 2003/0233616 A1 * | 12/2003 | Gilinsky ........................ 715/503 |
| 2005/0038700 A1 | 2/2005 | Doemling et al. |

(Continued)

FOREIGN PATENT DOCUMENTS

| | | |
|---|---|---|
| WO | WO-2005064511 A1 | 7/2005 |
| WO | WO-2006069445 A1 | 7/2006 |
| WO | WO-2007113904 A1 | 10/2007 |
| WO | WO-2008078934 A1 | 7/2008 |

OTHER PUBLICATIONS

Frank McKenna, CEO Knowledgeone Corporation, Thin-Client VS Fat-Client Computing 2002.*

(Continued)

*Primary Examiner* — John G Weiss
*Assistant Examiner* — Saba Dagnew
(74) *Attorney, Agent, or Firm* — Fiala & Weaver P.L.L.C.

(57) ABSTRACT

A dynamic advertisement creative is generated from a static advertisement creative. An advertisement creative is received. The advertisement creative is decompiled into a plurality of static elements. A user is enabled to select a static element of the plurality of static elements to be converted into a dynamic element. A dynamic version of the received advertisement creative is generated that includes a placeholder corresponding to the selected static element. The placeholder is configured to be dynamically populated with data. The data populating the placeholder may be dynamically selected each time the dynamic advertisement creative is displayed.

12 Claims, 11 Drawing Sheets

U.S. PATENT DOCUMENTS

| | | | |
|---|---|---|---|
| 2005/0144073 A1* | 6/2005 | Morrisroe et al. | 705/14 |
| 2005/0287625 A1* | 12/2005 | Miller et al. | 435/67 |
| 2006/0039733 A1* | 2/2006 | Meyerhofer | 400/62 |
| 2007/0100698 A1* | 5/2007 | Neiman et al. | 705/14 |
| 2007/0168251 A1* | 7/2007 | Hilbert et al. | 705/14 |
| 2007/0239526 A1 | 10/2007 | Welts | |
| 2007/0241120 A1* | 10/2007 | Henry | 221/2 |
| 2008/0028064 A1 | 1/2008 | Goyal et al. | |
| 2008/0052156 A1 | 2/2008 | Brenner | |
| 2008/0140524 A1 | 6/2008 | Anand et al. | |
| 2008/0201220 A1 | 8/2008 | Broder et al. | |
| 2008/0208674 A1 | 8/2008 | Hamilton et al. | |
| 2008/0209315 A1 | 8/2008 | Pasquali | |
| 2008/0215968 A1* | 9/2008 | Bekerman | 715/255 |

OTHER PUBLICATIONS

"SWF File Format Specification, Version 9", *Adobe Systems Incorporated*, (Apr. 2008), 284 pages.

"Yahoo!'s New "SmartAds" Meld Brand and Direct Response Advertising", http://yhoo.client.shareholder.com/press/ReleaseDetail.cfm?, (Jul. 2, 2007), 2 pages.

"Dynamic Advertising Solutions", http://www.adperfect.com/web-ads/smart-technology.html, (Retrieved on Sep. 26, 2008), AdPerfect, 2 pages.

Aaronson, Jack, "Dynamic E-mail and Banner Ads", http://www.clickz.com/showPage.html?page=3629896, (Jun. 13, 2008), 5 pages.

* cited by examiner

DECOMPILATION USED TO GENERATE DYNAMIC DATA DRIVEN ADVERTISEMENTS

BACKGROUND OF THE INVENTION

1. Field of the Invention

The present invention relates to the generation of advertisements for display on electronic devices.

2. Background

According to one definition, advertising is a paid, one-way communication through a medium in which an advertiser is identified, and the message (i.e., the advertisement) provided by the advertiser is controlled. Advertising may be performed for a variety of purposes, including publicity, public relations, product placement, sponsorship, underwriting, and sales promotion. A variety of mediums are used to convey an advertisement, including television, radio, movies, magazines, newspapers, the Internet, and billboards.

Online advertising relates to the promoting of products and services using the Internet and World Wide Web. Typical online advertisement types include banner ads, floating ads, pop-up ads, and video ads which are provided through a browser to the user's computer desktop. Dynamic data driven online advertisements, such as Yahoo! Smart Ads, are becoming increasing popular. These types of ads provide one-to-one targeting between advertiser and user by customizing an advertising message to contextual parameters, such as user interests and user location. Dynamic data driven ads can perform significantly better than static advertisements, which are not customizable.

A challenge to dynamic data driven ads is their complexity. The building of a dynamic data driven ad typically requires complex programming to be performed. A dynamic data driven ad can typically only be built by persons (e.g., engineers) having a medium to high level of skill in computer front-end technologies such as Adobe® FLASH® and ActionScript™, both of which are published by Adobe Systems, Inc., headquartered in San Jose, Calif. Advertisement agencies and creative agencies, which frequently build the "creative" portion of an advertisement for advertising customers, often employ creative designers. Creative designers typically focus on the look-and-feel of an advertisement, and typically lack an advanced level of programming skill. As a result, creative designers frequently are unable to develop dynamic data driven ads, which impedes the overall process of building and trafficking dynamic data driven ads, and increases the cost and time required to run such campaigns. Thus, what is desired are more efficient ways of generating dynamic data driven ads.

BRIEF SUMMARY OF THE INVENTION

A dynamic advertisement creative is generated from a static advertisement creative. The static advertisement is decompiled into static elements, and any one or more of the static elements may be converted into a dynamic element. A dynamic advertisement creative is compiled from the one or more dynamic elements and any remaining static elements.

In an example method implementation, an advertisement creative is received. For example, the advertisement creative may be a static advertisement creative generated by a user that does not necessarily have programming skills. The received advertisement creative is decompiled into a plurality of static elements. A user is enabled to select a static element of the plurality of static elements to be converted into a dynamic element. A dynamic version of the received advertisement creative is generated that includes a placeholder corresponding to the selected static element. The placeholder is configured to be dynamically populated with data. Data to populate the placeholder may be selected each time the dynamic advertisement creative is to be displayed.

Furthermore, a schema may be generated that identifies the dynamic element. A call routine may be generated that is configured to enable the dynamic advertisement creative to be populated and displayed. For instance, the call routine may be configured to be loadable with data defined according to the generated schema. The call routine may be configured to enable the placeholder of the dynamic advertisement creative to be populated with data that was loaded in the call routine.

A request may be received from a web browser for an advertisement to display in a web page. The call routine may be loaded with selected data defined according to the generated schema. The call routine may be transmitted to the web browser. The web browser may execute the call routine to enable the dynamic advertisement creative to be requested, to enable the placeholder to be populated with the loaded data after the dynamic advertisement creative is received, and to enable the populated dynamic advertisement creative to be displayed.

In an example system implementation, a dynamic creative management tool is provided. The dynamic creative management tool includes an advertisement decompiler, a dynamic element selector, and a dynamic advertisement generator. The advertisement decompiler is configured to decompile a received advertisement creative into a plurality of static elements. The dynamic element selector is configured to enable a user to select a static element of the plurality of static elements to be converted into a dynamic element. The dynamic advertisement generator is configured to generate a dynamic version of the received advertisement creative that includes a placeholder corresponding to the selected static element. The placeholder is configured to be dynamically populated with data.

Computer program products are also described herein. The computer program products include a computer-readable medium having computer program logic recorded thereon for enabling a processing unit to generate dynamic advertisement creatives.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
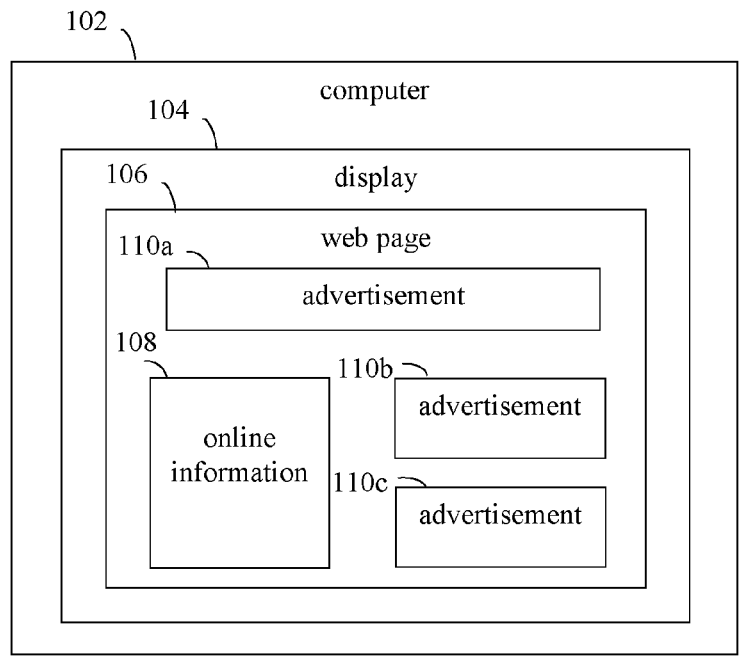
FIG. 1 shows a block diagram of a computer that a user may use to view online information, including online advertisements.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

Embodiments of the present invention relate to online advertising. FIG. 1 shows an example of advertisements being displayed in an online environment. For instance, FIG. 1 shows a block diagram of a computer 102 that a user may use to view online information 108. As shown in FIG. 1, computer 102 has a display 104 that displays a web page 106. For example, web page 106 may be open in a web browser. The user may cause web page 106 to be displayed in any manner, including navigating to web page 106 according to a URL (uniform resource locator) address for web page 106, by entering a query into a search engine such that web page 106 is a search results page, by accessing an email or other online tool, etc. Computer 102 may be any type of electronic computing device, including a personal computer, a mobile computer (e.g., a laptop computer, a notebook computer, a handheld computer such as a personal digital assistant (PDA) or a Palm™ device, etc.), or a workstation.

As shown in FIG. 1, web page 106 includes online information 108 that the user has caused to be displayed. Furthermore, web page 106 may include any number and arrangement of advertisements, including advertisements 110a-110c shown in FIG. 1. Advertisements 110a-110c may be displayed according to any suitable form, including as banner ads, floating ads, pop-up ads, and video ads. In the example of FIG. 1, advertisement 110a is shown as a banner ad at the top of web page 106, and advertisements 110b and 110c are both positioned adjacent to a right edge of web page 106. Advertisements 110 may be displayed in any number and arrangement on web page 106.

Advertisements 110 are provided by advertisers to be displayed to users typically in exchange for money or other compensation provided to the providers of online information 108. Advertisements 110 may be static or dynamic. A static form of advertisement 108 is an advertisement having a fixed form that is not configurable on a display basis. A dynamic form of advertisement 110 has one or more elements that may be customized on a display basis.

Figure 2:
FIG. 2 shows an example online advertisement.

For example, FIG. 2 shows an example online advertisement 200. Advertisement 200 may be one of advertisements 110a-110c shown in FIG. 1, for instance. Advertisement 200 shown in FIG. 2 is an advertisement for an airline, and provides a price ($75) for airfare for a particular flight (from San Francisco to Los Angeles). As shown in FIG. 2, advertisement 200 includes a plurality of elements, including first-sixth elements 202, 204, 206, 208, 210, and 212. First element 202 is the text "San Francisco." Second element 204 is the text "to Los Angeles." Third element 206 is the text "$75." Fourth element 208 is a graphical element (a shaded rectangle with rounded corners) that includes the text "BOOK NOW AT AA.COM." Fifth element 210 is the text "*For roundtrip travel July 09-July 13, found 03 hr 32 min ago. Availability and price subject to change. Additional taxes, fees, and conditions apply." Sixth element 212 is a background graphical element for all of elements 202, 204, 206, 208, and 210, that includes a shaded rectangular background, a shaded bottom rectangle imposed on the rectangular background that includes the text "AmericanAirlines," and a top view of a nose section of a jumbo jet protruding in from a central portion of a left edge of the rectangular background.

The form and content of advertisement 200 shown in FIG. 2 is provided for illustrative purposes, and is not intended to be limiting. Embodiments of the present invention described herein are applicable to any advertisement content for any advertiser, and all forms of advertisements, including advertisements having any number of one or more of elements 206.

Although advertisement 200 is provided in an airline context, advertisements herein may be provided for advertising of any type of product and/or service.

Advertisement 200 may be a static or dynamic advertisement. For example, if advertisement 200 is a static advertisement, elements 202, 204, 206, 208, 210, and 212 are fixed. Each time advertisement 200 is displayed on a web page, elements 202, 204, 206, 208, 210, and 212 will appear as shown in FIG. 2 and described above. If advertisement 200 is a dynamic advertisement, one or more of elements 202, 204, 206, 208, 210, and 212 may be configurable. Each time advertisement 200 is displayed on a web page, one or more of elements 202, 204, 206, 208, 210, and 212 may appear differently from their appearance in FIG. 2. For example, the text of elements 202, 204, 206, 208, 210, and/or 212 may be modified. Additionally or alternatively, the graphical features of elements 208 and/or 210 may be modified, the font sizes, font colors, font types, etc., of the text of elements 202, 204, 206, 208, 210, and/or 212 may be modified, and/or other modifications may be made to elements 202, 204, 206, 208, 210, and/or 212.

A dynamic advertisement may also be referred to as a "dynamic data driven advertisement." Dynamic data driven online advertisements, such as Yahoo! Smart Ads, are becoming increasing popular. These types of ads provide one-to-one targeting between an advertiser and user by customizing an advertising message to contextual parameters, such as user interests and user location. Dynamic data driven ads can perform significantly better than static advertisements.

Figure 3:
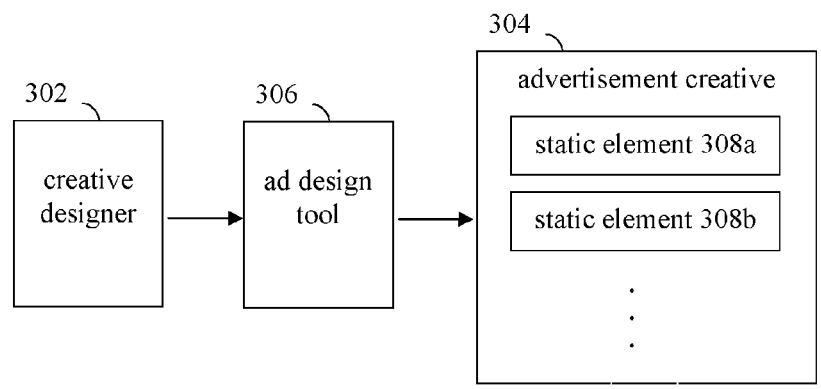
FIG. 3 shows a block diagram of a system for generating an advertisement, such as the advertisement shown in FIG. 2.

FIG. 3 shows a block diagram of a system 300 for generating an advertisement, such as advertisement 200 shown in FIG. 2. As shown in FIG. 3, system 300 includes an advertisement design tool 306. A creative designer 302 interacts with ad design tool 306 to generate an advertisement creative 304. Ad design tool 306 enables creative designer 302 to input textual, graphical, video, and/or audio elements used to form advertisement creative 304. Examples of ad design tool 306 include Adobe® Creative Studio 3, published by Adobe Systems, Inc., headquartered in San Jose, Calif., Microsoft® Silverlight™ published by Microsoft Corporation of Redmond, Wash., and further creative design tools. Such further design tools will be known to persons skilled in the relevant art(s).

Advertisement agencies and creative agencies, which frequently build the "creative" portion of an advertisement for advertising customers, often employ creative designers, such as creative designer 302. Creative designer 302 typically focuses on the look-and-feel of advertisement creative 304. Because creative designer 302 is typically not skilled in the more advanced features of ad design tools such as Adobe® FLASH®, Microsoft® Silverlight™, and is typically not skilled in programming in computer languages such as HTML (hypertext markup language), JavaScript™, and ActionScript™, advertisement creative 304 formed by creative designer 302 is a static advertisement. As shown in FIG. 3, advertisement creative 304 includes a plurality of static elements 308, including static elements 308a and 308b. Any number of static elements 308 may be present. Static elements 308 are elements, such as text, graphics, video, and/or audio that are present any time advertisement creative 304 is displayed.

Generating a dynamic data driven ad requires complex programming. Thus, a dynamic version of advertisement 304 can typically only be built by persons (e.g., engineers) having a medium to high level of skill in computer front-end technologies such as Adobe® FLASH®, Microsoft® Silverlight™, and/or computer languages such as HTML, JavaScript™, and ActionScript™, which enable the dynamic features of dynamic data driven ads. Thus, in many situations, to generate a dynamic advertisement, both creative designers (for the "look-and-feel") and skilled programmers (for the dynamic features) must collaborate.

Embodiments of the present invention enable dynamic advertisements to be generated without the requirement for a high level of programming skill. Examples of such embodiments are described in detail below.

Example Embodiments

Embodiments of the present invention enable dynamic advertisements to be generated without the requirement for a high level of programming skill. In an embodiment, an advertisement designer generates an advertisement with static elements. The advertisement is converted into a dynamic advertisement, where one or more of the static elements are converted into dynamic elements. The dynamic advertisement may be displayed any number of times, with the dynamic elements populated with data selected on a display basis.

Such embodiments enable creative advertisement designers (e.g., creative designer 302) to focus on presentation characteristics of advertisement creatives, rather than having to spend time and effort programming logic that makes an advertisement dynamic and data driven. Thus, such embodiments may reduce and amount of time and/or cost needed to bring a dynamic data driven ad campaign online. Furthermore, embodiments may enable a reduction in a number and frequency of errors in building dynamic data driven ads.

Example embodiments are described below for generating and displaying dynamic advertisements. For illustrative purposes, some example embodiments are described with regard to displaying dynamic advertisements in web pages. However, in alternative embodiments, dynamic advertisements as described herein may be displayed in other electronic form, including in widgets (e.g., desktop widgets such as Yahoo!® Widgets, Google® panels or gadgets, etc.), in text messages, and/or in/with other electronic content.

Figure 4:
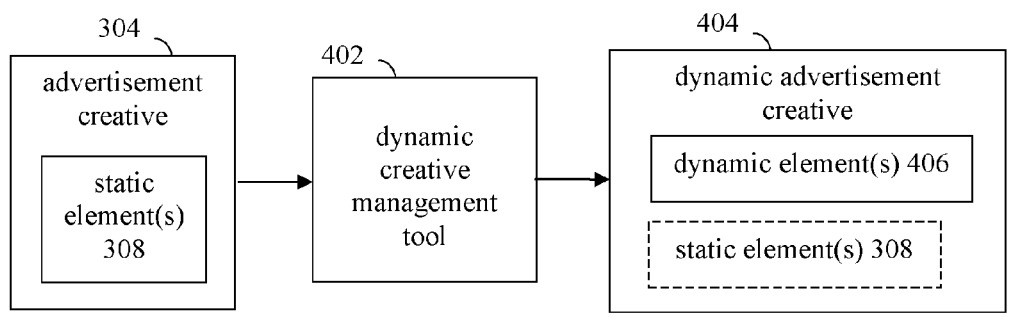
FIG. 4 shows a system for converting an advertisement having static elements into an advertisement with one or more dynamic elements, according to an example embodiment of the present invention.

FIG. 4 shows a system 400 for converting an advertisement with one or more static elements into an advertisement with one or more dynamic elements, according to an example embodiment of the present invention. As shown in FIG. 4, system 400 includes a dynamic creative management tool 402. Tool 402 loads advertisement creative 304, which includes one or more static elements 308. For example, creative designer 302 may interact with tool 402 (e.g., a user interface of tool 400) to load advertisement creative 304. Tool 402 processes advertisement creative 304 to generate a dynamic advertisement creative 404 that includes one or more dynamic elements 406. A dynamic element 406 is a former static element 308 converted into dynamic form. In embodiments, any number of static elements 308 of advertisement creative 304 may be converted into corresponding dynamic elements 406 in dynamic advertisement creative 404. Any static elements 308 that are not converted into dynamic form may remain as static elements 308 in dynamic advertisement creative 404 (as indicated by dotted line in FIG. 4).

Note that dynamic creative management tool 402 may be implemented in hardware, software, firmware, or any combination thereof. For example, dynamic creative management tool 402 may be implemented in hardware logic, and/or may include software/firmware that executes in one or more processors of one or more computer systems, such as one or more servers. Furthermore, dynamic creative management tool may be contained in a same computer system as ad design tool 306 (used to generate advertisement creative 304) shown in FIG. 3, or in a separate computer system. In an embodiment, dynamic creative management tool 402 may be included in and/or accessible from ad design tool 306. In another embodiment, dynamic creative management tool 402 may be separate from ad design tool 306.

Figure 5:
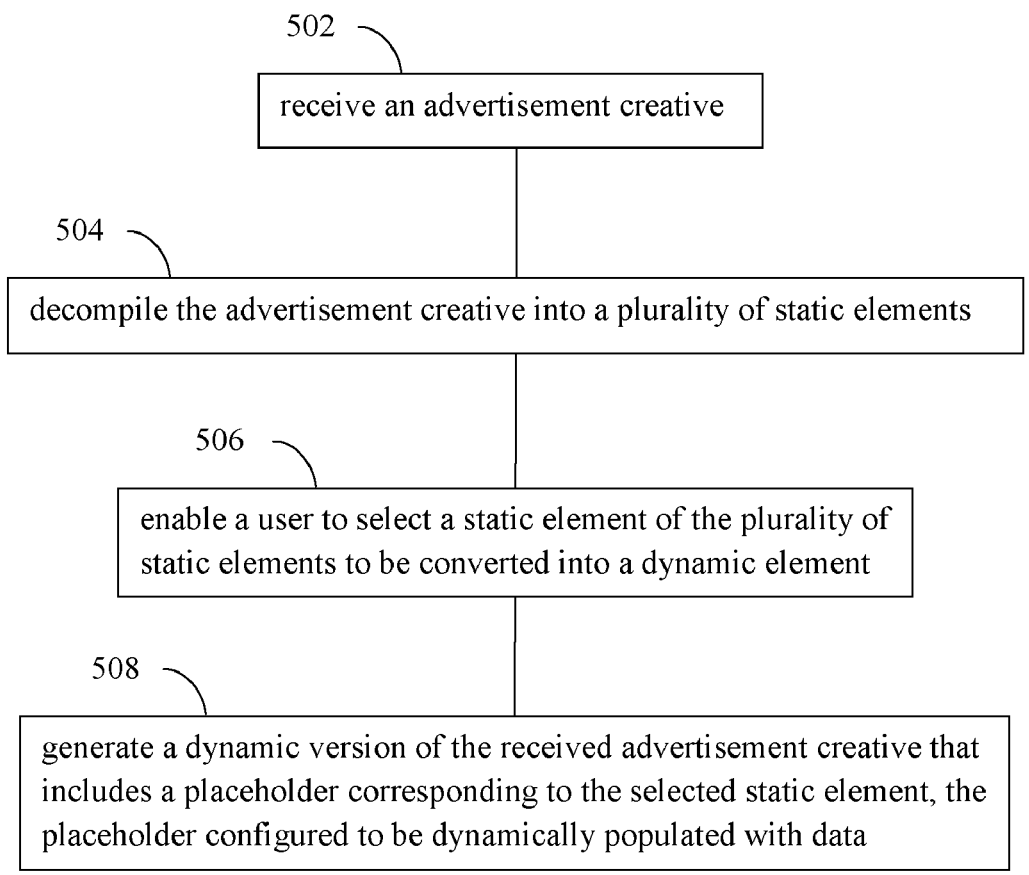
FIG. 5 shows a flowchart for converting advertisements into dynamic form, according to an example embodiment of the present invention.
Figure 6:
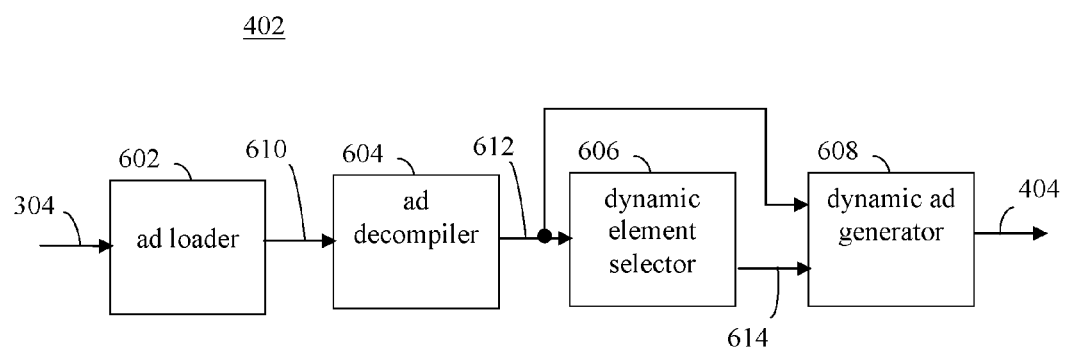
FIG. 6 shows a block diagram of a dynamic creative management tool, according to an example embodiment of the present invention.

Dynamic creative management tool 402 may be configured to convert advertisements into dynamic form in any suitable manner. For example, FIG. 5 shows a flowchart 500 for converting advertisements into dynamic form, according to an example embodiment of the present invention. Dynamic creative management tool 402 may operate according to flowchart 500, for example. Further structural and operational embodiments will be apparent to persons skilled in the relevant art(s) based on the discussion regarding flowchart 500. For instance, flowchart 500 is described with reference to an example embodiment of tool 402 shown in FIG. 6, for illustrative purposes. As shown in the embodiment of FIG. 6, tool 402 includes an advertisement loader 602, an advertisement decompiler 604, a dynamic element selector 606, and a dynamic advertisement generator 608. Flowchart 500 is described as follows.

Flowchart 500 begins with step 502. In step 502, an advertisement creative is received. For example, as shown in FIG. 6, advertisement loader 602 may load advertisement creative 304. As shown in FIG. 4, advertisement creative 304 includes one or more static elements 308. In an embodiment, advertisement loader 602 may provide a user interface. The user interface may be presented at a computer, may include a graphical user interface (GUI) and/or other type of user interface, and may be interacted with through a keyboard, a mouse pointer, etc., of the computer. A person, such as creative designer 302, may interact with the user interface to load advertisement creative 304 into tool 402. Alternatively, tool 402 may be contained in ad design tool 306 (FIG. 3), and advertisement loader 602 may not need to be present. When present, advertisement loader 602 may store a loaded advertisement creative 304 in storage (e.g., a hard disc drive, an optical disc drive, one or more memory devices, and/or other type of storage).

An advertisement creative 304 may have the form of one or more files of various suitable formats. For instance, advertisement creative 304 may be a .swf (shock wave flash) file if generated using Adobe Flash CS3 Professional or other similar tool published by Adobe Systems, Inc., headquartered in San Jose, Calif. In another example, advertisement creative 304 may be a Microsoft® Silverlight™ file. When present, advertisement loader 602 may be configured to load advertisement creative 304 in the form of one or more of such files. As shown in FIG. 6, advertisement loader 602 outputs the loaded advertisement creative 304 as loaded advertisement creative 610.

In step 504, the advertisement creative is decompiled into a plurality of static elements. For example, as shown in FIG. 6, advertisement decompiler 604 may receive and decompile loaded advertisement creative 610. In an embodiment, advertisement decompiler 604 may decompile loaded advertisement creative 610 by parsing loaded advertisement creative 610 to identify each of static elements 308. Static elements 308 of loaded advertisement creative 610 may include any number of identified text, graphics, video, and/or audio elements, such as images, shapes, frames, morphs, fonts, texts, buttons, videos, etc. Loaded advertisement creative 610 may be decompiled into any number of each of these types of static elements 308. The decompiling may be performed in various ways. For example, if loaded advertisement creative 610 is a .swf file, standard .swf decompilation techniques may be performed to decompile the .swf into its source codes and assets, and static elements 308 may thereby be identified therein. Example .swf file decompilers include Sothink™ SWF Decompiler 4.1, published by SourceTec Software Co., LTD, of Wuhan, China, and Flash Decompiler 1.30, published by Eltima Software GmbH of Frankfurt, Germany.

Figure 7:
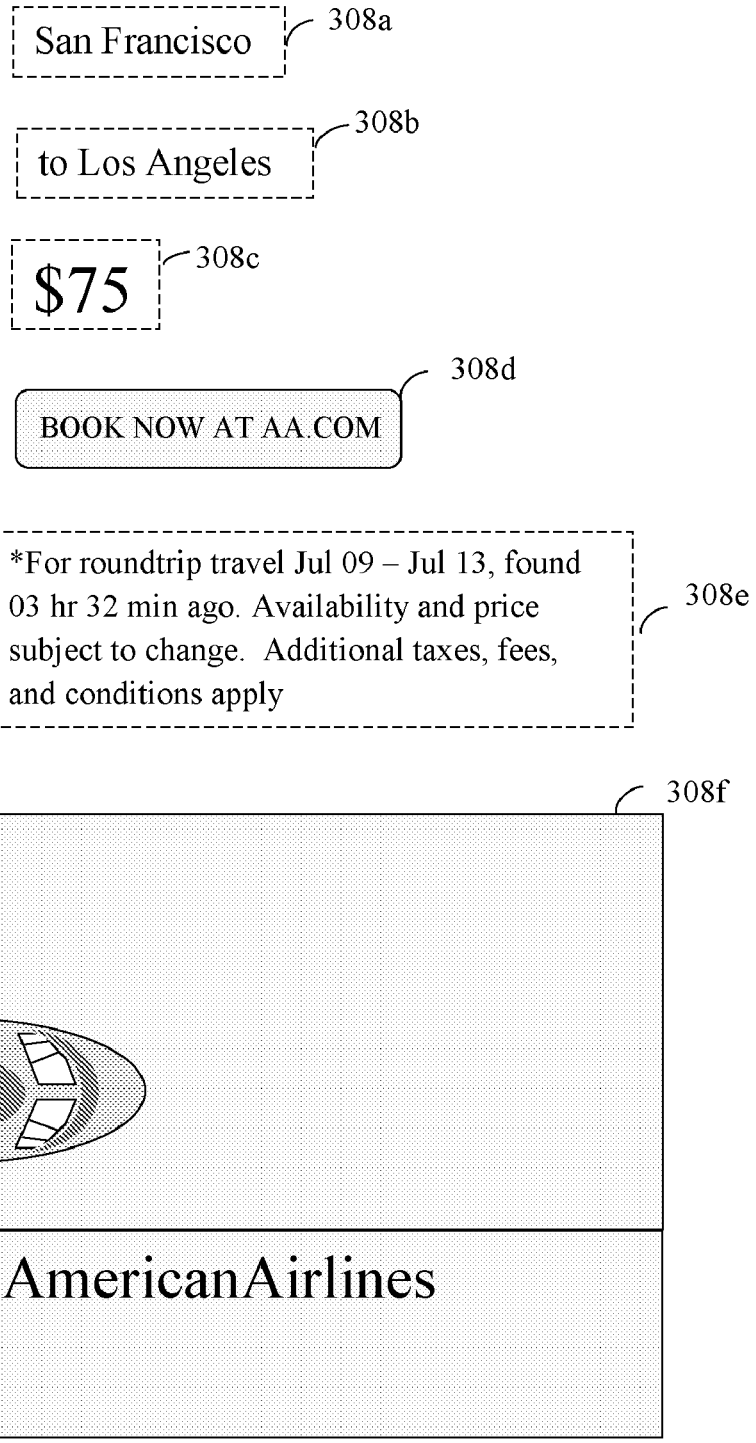
FIG. 7 shows graphical depiction of a decompiled advertisement, according to an embodiment of the present invention.

For instance, advertisement decompiler 604 may decompile advertisement 200 shown in FIG. 2 when advertisement 200 is provided to advertisement decompiler 604 as loaded advertisement creative 610. FIG. 7 shows a graphical depiction of the decompiling of advertisement 200 of FIG. 2 into an advertisement decompilation 700. As shown in FIG. 7, advertisement 200 is decompiled into a plurality of static elements 308a-308f. Static elements 308a-308f correspond to first-sixth elements 202, 204, 206, 208, 210, and 212 of advertisement 200 shown in FIG. 2. Static element 308a corresponds to first element 202 (text "San Francisco"). Static element 308b corresponds to second element 204 (text "to Los Angeles"). Static element 308c corresponds to third element 206 (text "$75"). Static element 308d corresponds to fourth element 208 (graphical element shaded rectangle with rounded corners, with text "BOOK NOW AT AA.COM"). Static element 308e corresponds to fifth element 210 (text "*For roundtrip travel July 09-July 13, found 03 hr 32 min ago. Availability and price subject to change. Additional taxes, fees, and conditions apply."). Static element 308f corresponds to sixth element 212 (background graphical element, with text "AmericanAirlines").

Advertisement decompiler 604 may decompile advertisement 200 into static elements 308a-308f shown in FIG. 7. The decompiled static elements 308a-308f may be stored together in a single file or in separate files.

As shown in FIG. 6, advertisement decompiler 604 outputs a decompiled version of loaded advertisement creative 610 as decompiled advertisement creative 612. Decompiled advertisement creative 612 may include the decompiled advertisement in the form of one or more files that include elements 308, or in any other suitable form. Decompiled advertisement creative 612 may include any suitable information that defines each of elements 308, including the actual text, image files, video files, audio files, etc., and further including information such as a location and/or size of each of elements 308 in advertisement 200.

Figure 8:
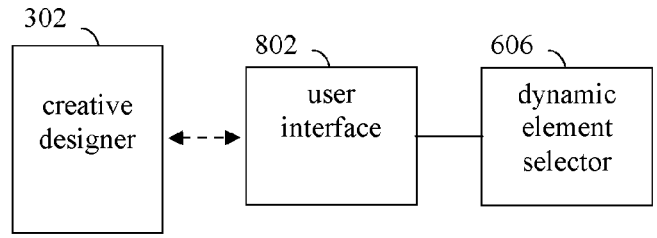
FIG. 8 shows a block diagram showing a user interface that enables a creative designer to select dynamic elements, according to an example embodiment of the present invention.

In step 506, a user is enabled to select a static element of the plurality of static elements to be converted into a dynamic element. For example, as shown in FIG. 6, dynamic element selector 606 receives decompiled advertisement creative 612. Dynamic element selector 606 may be configured to enable a user to select one or more static elements 308 to be converted into corresponding dynamic elements (e.g., dynamic elements 406 shown in FIG. 4). For instance, dynamic element selector 606 may provide a user interface, such as a user interface 802 shown in FIG. 8. User interface 802 may be presented at a computer, may include a graphical user interface (GUI) (e.g., displayed by the computer) and/or other user interface, and may be interacted with through a keyboard, a mouse pointer, etc., of the computer. A person, such as creative designer 302, may interact with user interface 802 to select one or more of static elements 308 to be converted into corresponding dynamic elements 406. As shown in FIG. 6, dynamic element selector 606 outputs an indication of static elements 308 that were selected to be converted into dynamic elements 406 as dynamic element indication 614.

Figure 9:
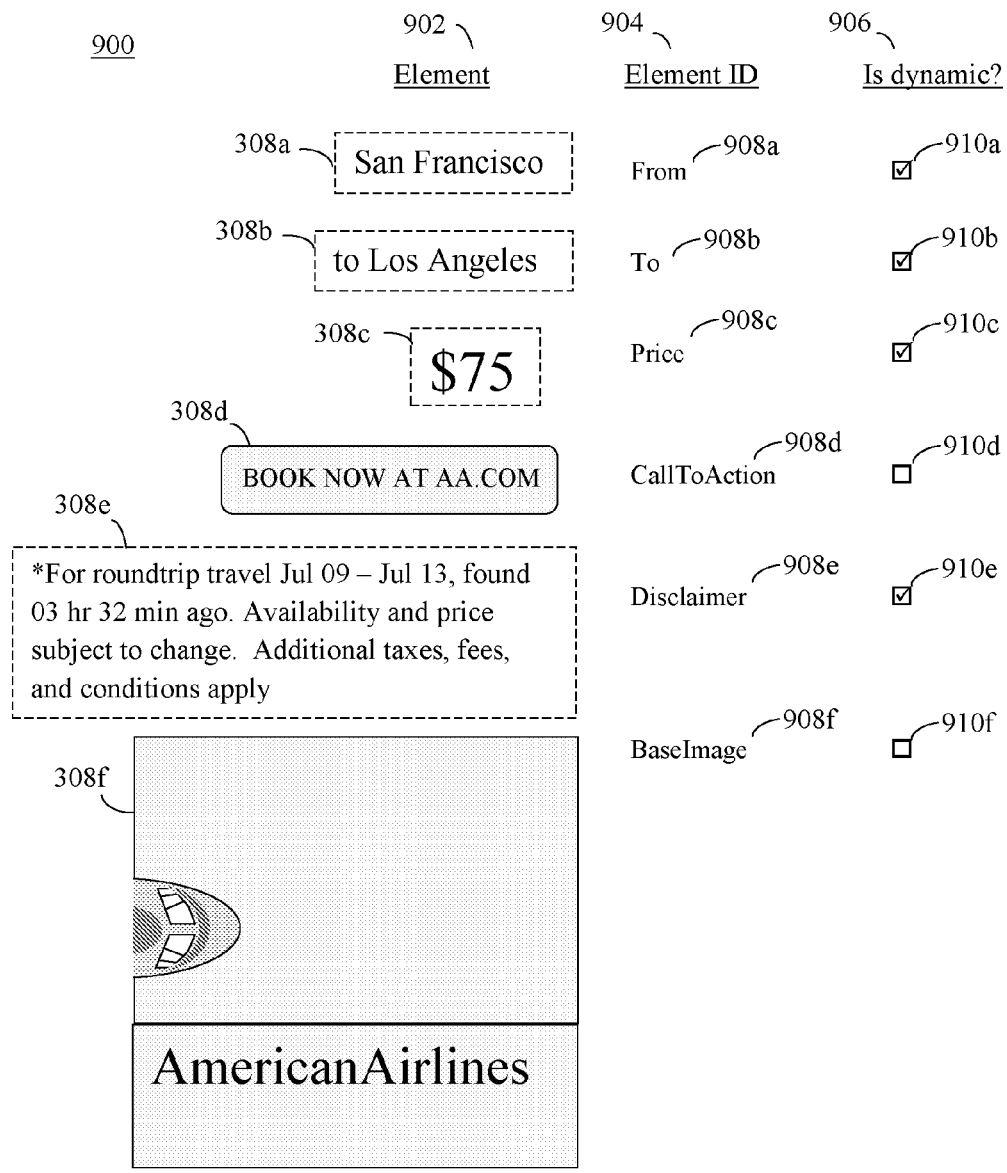
FIG. 9 shows an example graphical user interface configured to enable a user to select static advertisements elements to be configured into dynamic form, according to an embodiment of the present invention.

For instance, FIG. 9 shows an example GUI 900 configured to enable a user to select static elements to be configured into dynamic form, according to an embodiment of the present invention. As shown in FIG. 9, GUI 900 includes an element display column 902, an element ID display column 904, and a dynamic selector column 906. In the example of FIG. 9, advertisement decompilation 700 of FIG. 7 (the decompiled form of advertisement 200 shown in FIG. 2), is shown as being operated upon by GUI 900, for illustrative purposes.

Element display column 902 of GUI 900 shows each static element 308 (static elements 308a-308f of advertisement decompilation 700) in list form. Element ID display column 904 of GUI 900 shows a textual identifier 908 for each static element 308 in column 902. A textual identifier 908 is text that is typically selected as to briefly describe the corresponding static element 308. For instance, in the example of FIG. 9, an identifier 908a of "From" is provided for static element 308a, an identifier 908b of "To" is provided for static element 308b, an identifier 908c of "Price" is provided for static element 308c, an identifier 908d of "CallToAction" is provided for static element 308d, an identifier 908e of "Disclaimer" is provided for static element 308e, and an identifier 908f of "BaseImage" is provided for static element 308f. In an embodiment, identifiers 908a-908f are automatically generated for each of static elements 308f (e.g., from information in advertisement decompilation 700). In a further embodiment, GUI 900 may enable a user to modify identifiers 908 as desired. For example, a user may use GUI 900 to modify identifier 908d from "CallToAction" to "ActionImage," or to other identifying text.

Dynamic selector column 906 of GUI 900 shows a user interface element 910 for each static element 308 in column 902. A user interface element 910 is a user interface element, such as a check box (as in FIG. 9), a pull down menu, a radio button, or other user interface element, which a user can use to select whether the corresponding static element 308 is to be converted into dynamic form. In the example of FIG. 9, user interface elements 910a-910f are present, corresponding to static elements 308a-308f. A user (e.g., creative designer 302) may interact with any one or more of user interface element 910a-910f to convert a corresponding one or more of static elements 308a-308f to dynamic form.

As shown in the example of FIG. 9, a user has interacted with user interface elements 910a-910c and 910e corresponding to static elements 308a-308c and 308e, to have static elements 308a-308c and 308e converted into dynamic elements (e.g., dynamic elements 406a-406c and 406e). In this manner, static elements 308a-308c and 308e, which respectively refer to a "from" location, a "to" location, a "price" (airfare), and a "disclaimer", can be converted to dynamic elements that can be dynamically modified to provide varying flight to, from, price, and disclaimer information. Such information may be varied according to a variety of attributes, such as attributes of a user intended to view the resulting dynamic advertisement and/or other variable attributes related to the advertisement. Such user attributes may include a location of the user (e.g., the "from" static element 308a may be modified to a determined location of the user intended to view the ad), a current time in a time zone of the user (e.g., the "disclaimer" static element 308e may be modified to indicate a time in the time zone of the user), and/or other user attributes. In the current example, static elements 308 may be converted to dynamic elements that can be modified according to further user and/or advertisement attributes, such as modifying the "destination" static element 308b to select a destination of interest to the user, modifying "price" static element 308c according to a price of a flight corresponding to the "to" and "from" static elements 308a and 308b, modifying the "disclaimer" static element 308e with an indication of the allowable travel dates corresponding to the "to," "from," and "price" static elements 308a-308c. The "to," "from," and "price" information may be derived from the advertiser (e.g., the airline), for example.

In step 508, a dynamic version of the received advertisement creative is generated that includes a placeholder corresponding to the selected static element, the placeholder configured to be dynamically populated with data. For example, as shown in FIG. 6, dynamic advertisement generator 608 receives decompiled advertisement creative 612 and dynamic element indication 614. Dynamic advertisement generator 608 generates a dynamic version of advertisement creative 304 based on decompiled advertisement creative 612 and dynamic element indication 614. As shown in FIG. 6, dynamic advertisement generate outputs the dynamic version of advertisement creative 304 as dynamic advertisement creative 404.

Figure 10:
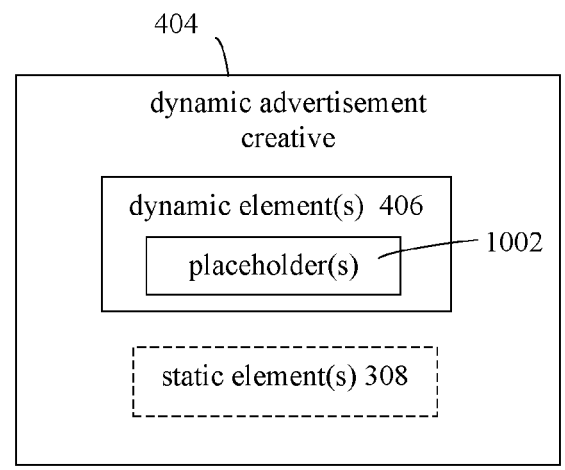
FIGS. 10 and 11 show block diagrams of dynamic advertisement creatives, according to example embodiments of the present invention.

For instance, FIG. 10 shows a block diagram of dynamic advertisement creative 404 which may be generated by dynamic advertisement generator 608, according to an example embodiment of the present invention. As shown in FIG. 10, dynamic advertisement creative 404 includes one or more dynamic elements 406, and may include one or more static elements 308. Furthermore, one or more placeholders 1002 are present in dynamic advertisement creative 404 that correspond to dynamic element(s) 406. Each placeholder 1002 is configured to be dynamically filled in with selected data when dynamic advertisement creative 404 is to be displayed.

Figure 11:
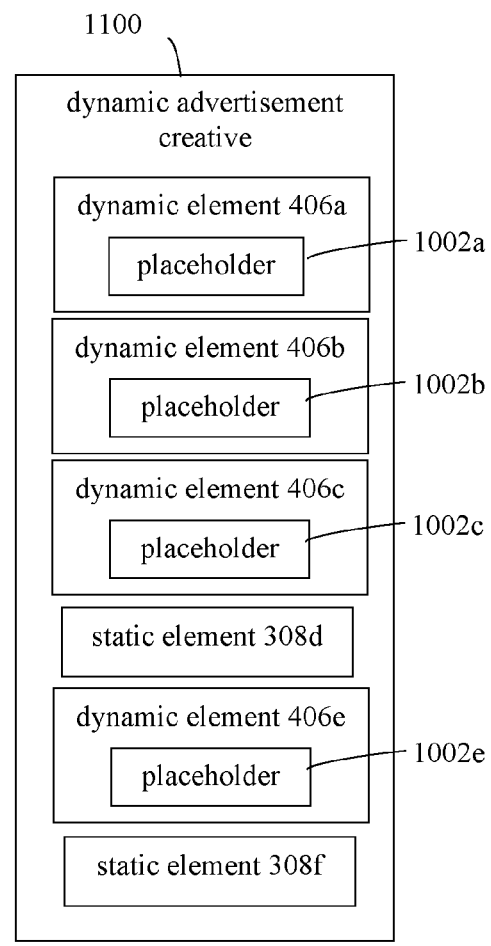

FIG. 11 shows a block diagram of a dynamic advertisement creative 1100, according to an example embodiment of the present invention. Dynamic advertisement creative 1100 is an example of dynamic advertisement creative 404 generated by dynamic advertisement generator 608 for the example of advertisement decompilation 700 shown in FIG. 7. In the current example, user interface elements 910a-910c and 910e were selected in FIG. 9 to indicate that static elements 308a-308c and 308e are to be converted to dynamic form. As shown in FIG. 11, dynamic advertisement generator 608 generates each of dynamic elements 406a-406c and 406e to include a corresponding one of placeholders 1002a-1002c and 1002e. Static elements 308d and 308f are present in dynamic advertisement creative 1100, because they were not selected to be dynamic (as described above with respect to FIG. 9). Placeholders 1002a-1002c and 1002e are respectively configured to be populated with dynamic "from," "to," "price," and "disclaimer" data, as described above.

Figure 12:
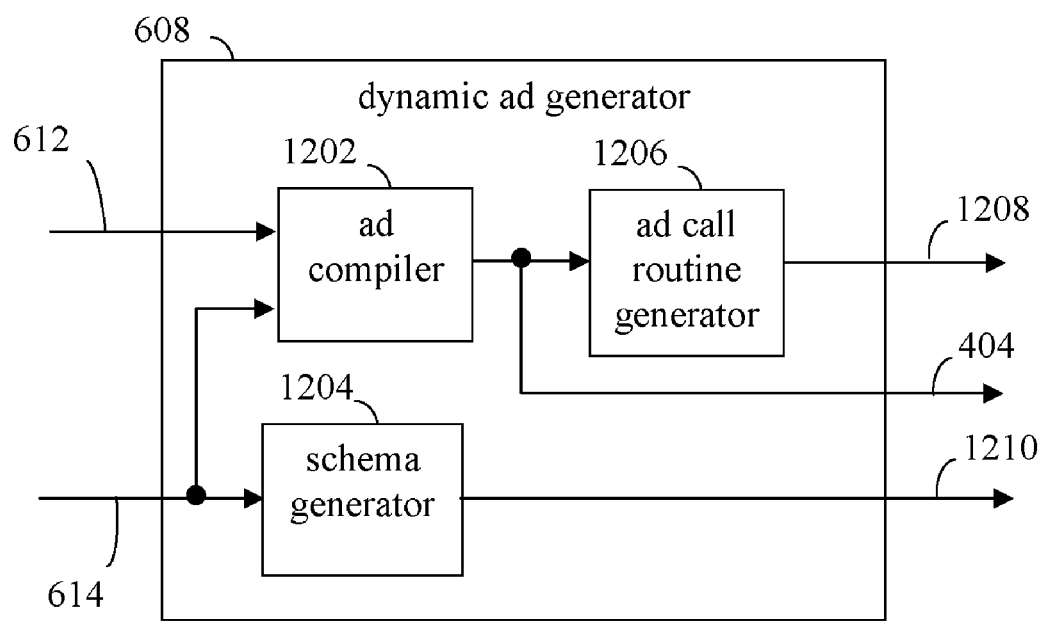
FIG. 12 shows a block diagram of a dynamic advertisement generator, according to an example embodiment of the present invention.

Dynamic advertisement generator 608 may be configured in various ways to generate dynamic advertisement creative 404. For instance, FIG. 12 shows a block diagram of dynamic advertisement generator 608, according to an example embodiment of the present invention. As shown in FIG. 12, dynamic advertisement generator 608 includes an advertisement compiler 1202, a schema generator 1204, and an advertisement call routine generator 1206. These elements of dynamic advertisement generator 608 are described as follows.

As shown in FIG. 12, advertisement compiler 1202 receives decompiled advertisement creative 612 and dynamic element indication 614. Advertisement compiler 1202 is configured to generate logic (e.g., "programming logic") to enable the one or more selected static elements 308 to perform as dynamic elements 406. For example, advertisement compiler 1202 includes placeholders 1002 for any elements indicated as dynamic elements by dynamic element indication 614. Furthermore, advertisement compiler 1202 is configured to compile together the one or more dynamic elements 406, the generated logic, and any remaining static elements 308 of decompiled advertisement creative 612. As shown in FIG. 12, advertisement compiler 1202 outputs the compiled advertisement creative as dynamic advertisement creative 404. Dynamic advertisement creative 404 may have any suitable form, including being configured as a .swf in an Adobe Flash compatible version of creative 404, as a Microsoft® Silverlight™ file, or in any other suitable format.

As further shown in FIG. 12, schema generator 1204 receives dynamic element indication 614. Schema generator 1204 is configured to generate a dynamic schema 1210 (e.g., a file, table, or other data structure) used to indicate which elements of dynamic advertisement creative 404 are dynamic elements 406, and what type of data is used to fill the corresponding placeholders 1002. Dynamic schema 1210 may have any suitable form, including being XML (extensible markup language) code, HTML code, a table, a data array, or other data structure.

An example of dynamic schema 1210 is shown below, in the form of XML code, for the example of advertisement decompilation 700 shown in FIG. 7 (for the selection of dynamic elements 406a-406c and 408e):

```
<schema="AirlineSchema" type="CreativeSchema">
<dyndata min=1 max=1>
<field name="from" type="string"/>
<field name="to" type="string"/>
<field name="price" type="string"/>
<field name="disclaimer" type="string"/>
</dyndata>
</schema>
```

As shown above, dynamic schema 1210 has a schema identifier name of "AirlineSchema." In the current example, dynamic element indication 614 indicates that dynamic elements 406a-406c and 406e are dynamic, because user interface elements 910a-910c and 910e were checked in FIG. 9. Thus, schema generator 1204 generates dynamic schema 1210 to identify dynamic elements 406a-406c and 406e, and to indicate the expected data for placeholders 1002a-1002c and 1002e corresponding to dynamic elements 406a-406c and 406e. As shown above, dynamic schema 1210 identifies dynamic elements 406a-406c and 406e according to identifiers 908a-908c and 908f shown in FIG. 9. Dynamic element 406a is identified as a "from" field, with a "string" type of data expected to fill placeholder 1002a. Dynamic element 406b is identified as a "to" field, with a "string" type of data expected to fill placeholder 1002b. Dynamic element 406c is identified as a "price" field, with a "string" type of data expected to fill placeholder 1002c. Dynamic element 406e is identified as a "disclaimer" field, with a "string" type of data expected to fill placeholder 1002e.

Note that that the form of dynamic schema 1210 shown above is provided for illustrative purposes, and is not intended to be limiting. Any variety of applicable forms for dynamic schema 1210, according to any suitable code and/or data structure, will be known to persons skilled in the relevant art(s) from the teachings herein.

As further shown in FIG. 12, advertisement call routine generator 1206 receives dynamic advertisement creative 404. Advertisement call routine generator 1206 is configured to generate a routine configured to call dynamic advertisement creative 404 for display as an advertisement, and to populate placeholders 1002 of dynamic advertisement creative 404 according to dynamic schema 1210. As shown in FIG. 12, advertisement call routine generator 1206 generates a dynamic advertisement call routine 1208. Dynamic advertisement call routine 1208 may have any suitable form, including as XML (extensible markup language) code, HTML code, JavaScript code, or any other suitable computer code or routine. Dynamic advertisement call routine 1208 may be transmitted to a computer requesting an advertisement (e.g., computer 102 of FIG. 1), and may be executed at the computer (e.g., by a web browser) to call and populate a dynamic advertisement creative identified in routine 1208.

An example of dynamic advertisement call routine 1208 is shown below, in the form of HTML code, for the current example:

```
var __oxml = '%offerxml%';
var lrec__flashfile = "http://dynamicadvertisementcreativepath/airline__ad.swf";
var lrec__altimg="http://dynamicadvertisementcreativepath/airline__ad.gif";
var lrec__width=300;
var lrec__height=250;
```

The first line of routine 1208 defines a placeholder for identification of a dynamic schema 1210—"% offerxml %"—that is applicable to a dynamic advertisement creative 404 to be called by routine 1208. The second line of routine 1208 defines a path and file name for the applicable dynamic advertisement creative 404. In the above example, dynamic advertisement creative 404 is a .swf file (airline_ad.swf). The third line of routine 1208 defines a path and file name for an image file (e.g., a .gif file in this example) to be displayed if the computer that receives routine 1208 is not capable of displaying dynamic advertisement creative 404 (e.g., is not configured for Adobe® FLASH®, in the current example). The fourth and fifth lines of routine 1208 may be present to define a display size (width and height, respectively) for the advertisement.

Note that that the form of dynamic advertisement call routine 1208 shown above is provided for illustrative purposes, and is not intended to be limiting. Any variety of applicable forms for dynamic advertisement call routine 1208, according to any suitable code and/or routine, will be known to persons skilled in the relevant art(s) from the teachings herein.

Dynamic advertisement creative 404, dynamic schema 1210, and dynamic advertisement call routine 1208 generated by dynamic advertisement generator 608 may be stored in storage together or separately, as desired for the particular advertising application.

The following section describes example embodiments for distributing, populating, and displaying dynamic advertisements, such as dynamic advertisement create 404 described above.

Example Dynamic Advertisement Distribution Embodiments

Figure 13:
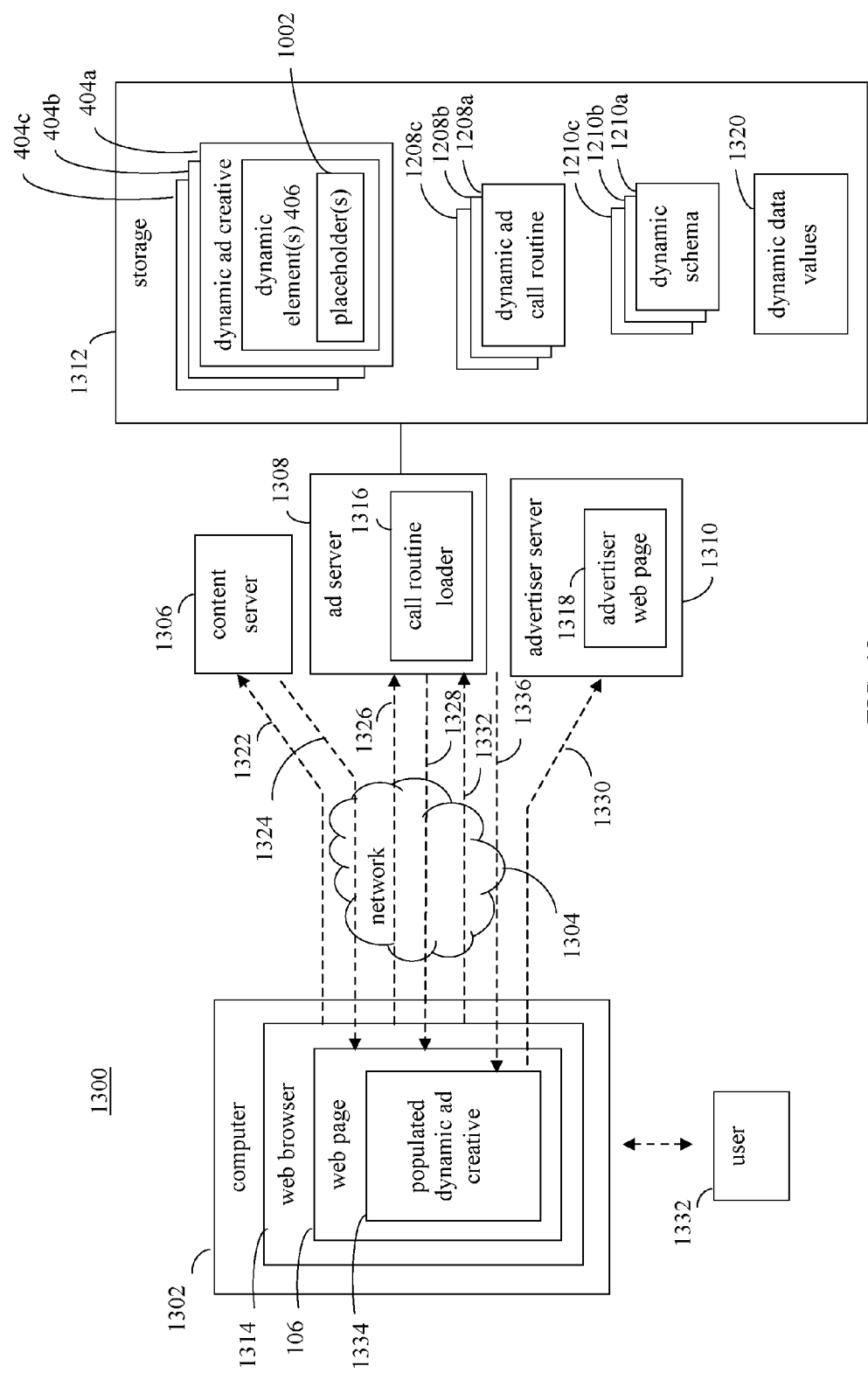
FIG. 13 shows a block diagram of an advertisement distribution system, according to an example embodiment of the present invention.

After a dynamic advertisement creative 404 is generated, it may be displayed on one or more web pages, with placeholders 1002 corresponding to each dynamic element 406 dynamically populated with data, according to the particular advertising application. A dynamic advertisement creative 404 may be distributed for display in any manner, as would be known to persons skilled in the relevant art(s). For instance, FIG. 13 shows a block diagram of an advertisement distribution system 1300, according to an example embodiment of the present invention. In system 1300, a plurality of dynamic advertisement creatives 404 are enabled to be dynamically populated, distributed, and displayed. System 1300 is provided for purposes of illustration, and is not intended to be limiting. Dynamic advertisement creatives 404 may be dynamically populated, distributed, and displayed in a variety of ways and environments, as would be known to persons skilled in the relevant art(s).

Figure 14:
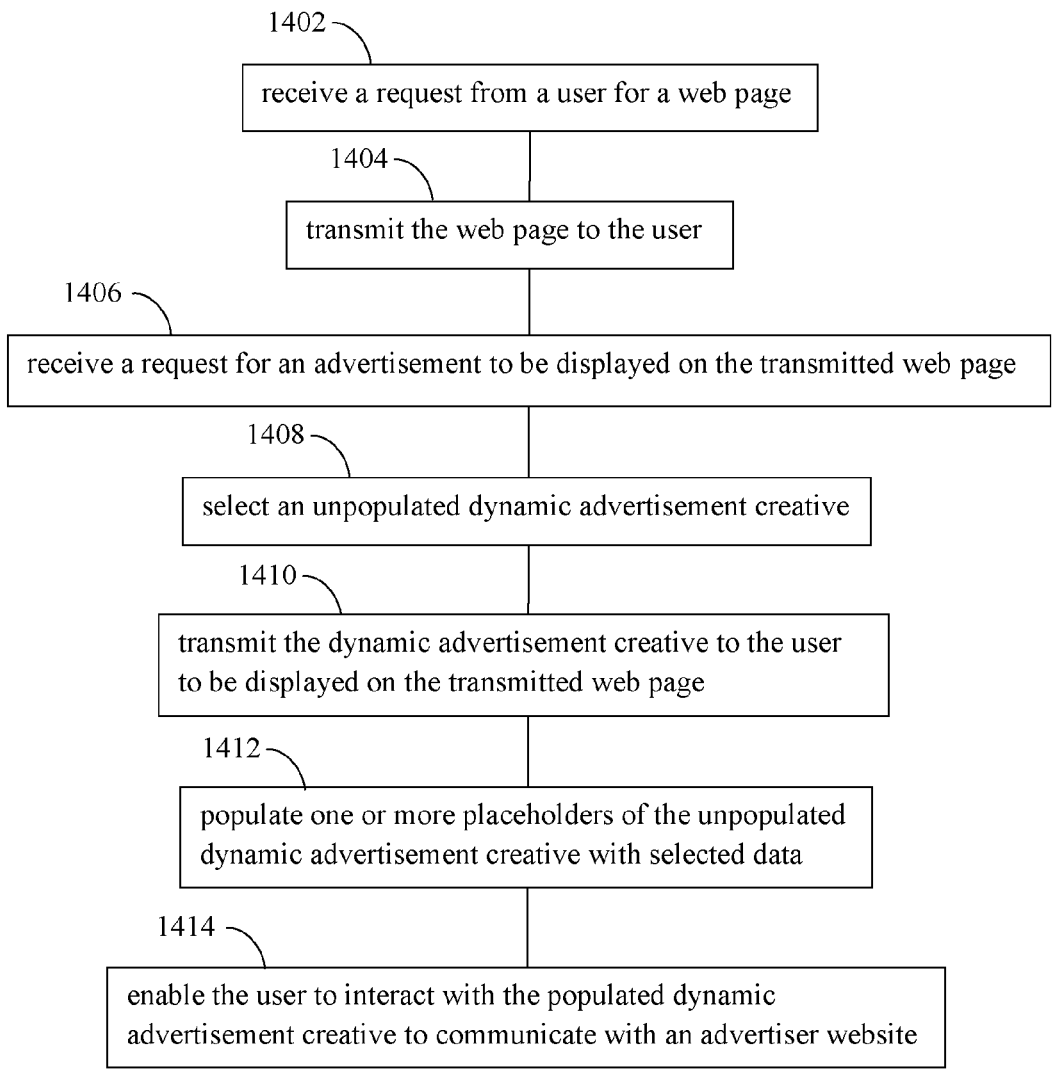
FIG. 14 shows a flowchart for distributing dynamic advertisements, according to an example embodiment of the present invention.

As shown in FIG. 13, system 1300 includes a computer 1302, a network 1304, a content server 1306, an advertisement server 1308, an advertiser server 1310, and storage 1312. System 1300 is described as follows with respect to FIG. 14. FIG. 14 shows a flowchart 1400 for distributing dynamic advertisements, according to an example embodiment of the present invention. System 1300 may operate according to flowchart 1400, for example. Further structural and operational embodiments will be apparent to persons skilled in the relevant art(s) based on the discussion regarding flowchart 1400. Flowchart 1400 is described as follows.

Flowchart 1400 begins with step 1402. In step 1402, a request from a user for a web page is received. For example, as shown in FIG. 13, a user 1332 may interact with a web browser 1314 at computer 1302 in an attempt to view a web page. Web browser 1314 may be any type of web browser, including Internet Explorer®, published by Microsoft® Corporation, Mozilla Firefox™, published by Mozilla Corporation of Mountain View, Calif., or other commercially available, open source, or proprietary web browser. Computer 1302 is generally similar to computer 102 shown in FIG. 1 and described above. User 1332 may interact with web browser 1314 in any manner to request a web page, including by navigating to the web page according to a URL (uniform resource locator) address, by entering a query into a search engine, by accessing an email or other online tool, etc.

The interaction by user 1332 with web browser 1314 causes web browser 1314 to transmit a first communication signal 1322 from computer 1302 through network 1304 to content server 1306. First communication signal 1322 includes a request for the web page desired by user 1332. First communication signal 1322 (and further communication signals shown in FIG. 13) may be transmitted in any suitable format, including according to HTTP (hypertext transfer protocol). Network 1304 may be any type of communications network that includes wired and/or wireless links, such as a local area network (LAN), a wide area network (WAN), or combination of networks, such as the Internet. First communication signal 1322 is received by content server 1306.

In step 1404, the web page is transmitted to the user. Content server 1306 is configured to process requests for content, such as a request for a web page as received in first communication signal 1322. Examples of content server 1306 include content servers for any number of websites that provide content in the form of news and/or other forms of information, including Yahoo! (www.yahoo.com), MSNBC (www.msnbc.com), The New York Times (nytimes.com), Dictionary.com (www.dictionary.com), etc. Alternatively, content server 1306 may be a search engine, a website for an email server, etc. As shown in FIG. 13, content server 1306 transmits a second communication signal 1324 through network 1304 to computer 1302. Second communication signal 1324 includes the web page requested by user 1332. Computer 1302 receives second communication signal 1324. Web browser 1304 receives the requested web page from second communication signal 1324, and displays the web page as web page 106.

In step 1406, a request is received for an advertisement to be displayed on the transmitted web page. As shown in FIG. 1, web page 106 may include online information 108 that the user has caused to be displayed. Furthermore, web page 106 may include any number and arrangement of advertisements, including advertisements 110*a*-110*c* shown in FIG. 1. When web page 106 is received, web page 106 includes placeholders for advertisements 110*a*-110*c*, and therefore advertisements 110*a*-110*c* need to be requested for display in web page 106. For example, as shown in FIG. 13, web browser 1314 transmits a third communication signal 1326 from computer 1302 through network 1304 to advertisement server 1308. Third communication signal 1326 includes a request for an advertisement, such as a request for advertisement 110*a* shown in FIG. 1. Advertisement server 1308 receives third communication signal 1326.

In step 1408, an unpopulated dynamic advertisement creative is selected. As shown in FIG. 13, advertisement server 1308 is coupled to storage 1312. Storage 1312 may include any type and quantity of storage, including one or more hard disc drives, optical disc drives, memory devices (e.g., random access memory (RAM) devices), and/or other type of storage. As shown in FIG. 13, storage 1312 stores a plurality of dynamic advertisement creatives 404, including first-third dynamic advertisement creatives 404*a*-404*c*. Furthermore, storage 1312 stores first-third dynamic advertisement call routines 1208*a*-1208*c* and first-third dynamic schema 1210*a*-1210*c* that correspond to first-third dynamic advertisement creatives 404*a*-404*c*. Storage 1312 also stores dynamic data values 1320.

In an embodiment, advertisement server 1308 selects one of dynamic advertisement creatives 404*a*-404*c* to be transmitted to computer 1302 to be used for advertisement 110*a*. In an embodiment, advertisement server 1308 may select one of dynamic advertisement creatives 404*a*-404*c* randomly. In another embodiment, advertisement server 1308 may select one of dynamic advertisement creatives 404*a*-404*c* determined to likely to be of interest to user 1332. For example, advertisement server 1308 may use known or determinable attributes of user 1332, such as location, local time, interests, prior web pages viewed, etc., to select one of dynamic advertisement creatives 404*a*-404*c* that is more likely to be clicked by user 1332 as compared to the others of dynamic advertisement creatives 404*a*-404*c*.

For instance, advertisement server 1308 may use an IP (internet protocol) address of computer 1302 (e.g., received in third communication signal 1326) to determine a location of user 1332/computer 1302. Techniques that are well known to persons skilled in the relevant art(s) may be used to determine a location of computer 1302 based on the IP address of computer 1302. Advertisement server 1308 may use the determined location of user 1332/computer 1302 to select one of dynamic advertisement creatives 404*a*-404*c* that relates to a business, product, or service relevant to the determined location of user 1332/computer 1302, such as a restaurant, store, bank, an airline having a local hub, etc. For instance, user 1332/computer 1302 may be determined to be located in Phoenix, Ariz. Advertisement server 1308 may select advertisement creative 404*a* as being likely to be clicked by user 1332/computer 1302 due to being proximate to user 1332/computer 1302. For example, advertisement creative 404*a* may be dynamic advertisement creative 1100 shown in FIG. 11 (a dynamic version of static advertisement creative 200 shown in FIG. 2).

In step 1410, the dynamic advertisement creative is transmitted to the user to be displayed on the transmitted web page. As shown in FIG. 13, advertisement server 1308 includes a call routine loader 1316. Prior to dynamic advertisement creative 404*a* being transmitted to computer 1302, call routine loader 1316 is configured to access a dynamic ad call routine 1208 and a dynamic schema 1210 corresponding to the selected dynamic advertisement creative 404. Call routine loader 1316 may use dynamic schema 1210 to determine the data needed to populate the selected dynamic advertisement creative 404. Call routine loader 1316 may input the determined data into dynamic ad call routine 1208.

For instance, in the current example, selected dynamic advertisement creative 404a is dynamic advertisement creative 1100 of FIG. 11 (a dynamic version of static advertisement creative 200 shown in FIG. 2). Call routine loader 1316 may access dynamic schema 1210a corresponding to selected dynamic advertisement creative 404a to determine data identifiers and corresponding data types to use to populate placeholders 1002 of selected dynamic advertisement creative 404a. Dynamic schema 1210a may have the example contents shown above in the prior section for the dynamic schema labeled "AirlineSchema." By analyzing these contents of dynamic schema 1210a, call routine loader 1316 can determine that four placeholders 1002a-1002c and 1002e are present in selected dynamic advertisement creative 404a (for dynamic elements 404a-404c and 404e), having corresponding identifiers of "from," "to," "price," and "disclaimer." Call routine loader 1316 may select data from dynamic data values 1320 (which may be supplied by advertisers) indicated by dynamic schema 1210a, and load the data into dynamic advertisement call routine 1208a (corresponding to dynamic advertisement creative 404a).

For example, call routine 1316 may retrieve the following data from dynamic data values 1320 for the current example, as identified by dynamic schema 1210a (shown in the prior section above): "from"="Phoenix"; "to"="San Jose"; "price"="$150"; and "disclaimer"="*For roundtrip travel April 08-April 15, found 01 hr 23 min ago." Call routine loader 1316 may load the data into dynamic advertisement call routine 1208a as shown below:

```
var _oxml = '<schema="AirlineSchema" type="CreativeSchema">
<dyndata><field name="from">Phoenix</field> <field name="to">to
    San Jose </field><field name="price">$150</field> <field
    name ="disclaimer">*For roundtrip travel Apr 08 - Apr 15, found
    01 hr 23 min ago. </field></dyndata></schema>';
var lrec_flashfile = "http://dynamicadvertisementcreativepath/
airline_ad.swf";
var lrec_altimg="http://dynamicadvertisementcreativepath/airline_ad.gif";
var lrec_width=300;
var lrec_height=250;
```

As shown above, the schema "AirlineSchema" and dynamic data values for placeholders 1002a-1002c and 1002e selected from dynamic data values 1320 are input into dynamic advertisement call routine 1208a for the placeholder "% offerxml %." The "from" field in routine 1208a is populated with "Phoenix," the "to" field in routine 1208a is populated with "to San Jose," the "price" field in routine 1208a is populated with "$150," and the "disclaimer" field in routine 1208a is populated with "*For roundtrip travel April 08-April 15, found 01 hr 23 min ago."

As shown in FIG. 13, advertisement server 1308 transmits a fourth communication signal 1328 through network 1304 to computer 1302. Fourth communication signal 1328 includes dynamic advertisement call routine 1208a, with information from dynamic schema 1210a loaded therein. Computer 1302 receives fourth communication signal 1328. Web browser 1304 receives dynamic advertisement call routine 1208a from fourth communication signal 1328. Web browser 1304 executes dynamic advertisement call routine 1208a. As a result, web browser 1314 transmits a fifth communication signal 1332 from computer 1302 through network 1304 to advertisement server 1308 to request dynamic advertisement creative 404a, identified in routine 1208a as "http://dynamicadvertisement creativepath/airline_ad.swf." Advertisement server 1308 receives fifth communication signal 1332, and accesses the identified .swf filed for dynamic advertisement creative 404a in storage 1312.

As shown in FIG. 13, advertisement server 1308 transmits a sixth communication signal 1336 through network 1304 to computer 1302 that includes the requested dynamic advertisement creative 404. In the current example, Sixth communication signal 1336 includes dynamic advertisement creative 404a. Computer 1302 receives sixth communication signal 1336.

In step 1412, one or more placeholders of the unpopulated dynamic advertisement creative is/are populated with selected data. Web browser 1304 receives dynamic advertisement creative 404 in sixth communication signal 1328. Web browser 1304 populates placeholders 1002 of the received dynamic advertisement creative 404. Following the current example, placeholders 1002a-1002c and 1002e in dynamic advertisement creative 404a are populated according to routine 1208a. For example, web browser 1304 may execute dynamic advertisement creative 404a (airline_ad.swf), which causes dynamic advertisement creative 404a to load the dynamic data provided in call routine 1208a. Placeholder 1002a is populated with "Phoenix," placeholder 1002b is populated with "to San Jose," placeholder 1002c is populated with "$150," and placeholder 1002e is populated with "*For roundtrip travel April 08-April 15, found 01 hr 23 min ago."

As shown in FIG. 13, web browser 1304 displays the populated version of the selected dynamic advertisement creative 404 as populated dynamic advertisement creative 1334 in web page 106.

Figure 15:
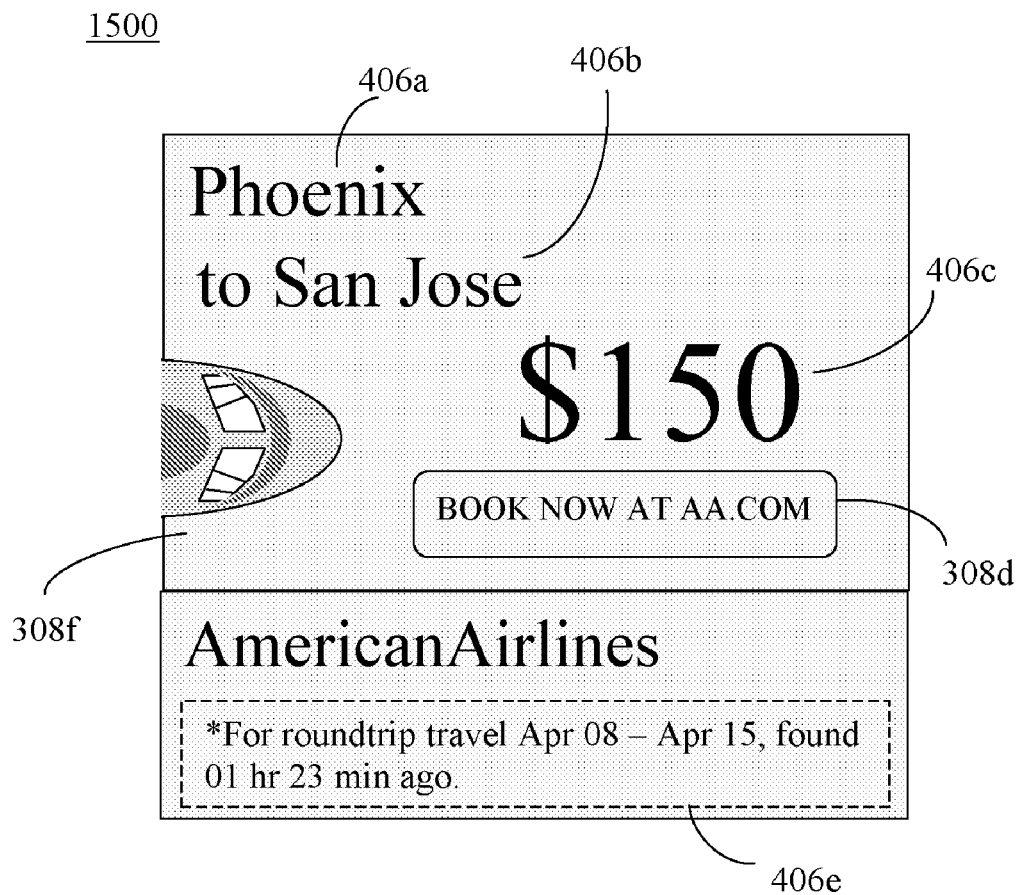
FIG. 15 shows a display of a populated dynamic advertisement creative, according to an example embodiment of the present invention.

FIG. 15 shows a display of a populated dynamic advertisement creative 1500, according to an example embodiment of the present invention. Populated dynamic advertisement creative 1500 is an example of a rendered display of populated dynamic advertisement creative 1334 shown in FIG. 13 for the current example. As shown in FIG. 15, populated dynamic advertisement creative 1500 includes dynamic element 406a populated with "Phoenix," dynamic element 406ba populated with "to San Jose," dynamic element 406c populated with "$150," and dynamic element 406e populated with "*For roundtrip travel April 08-April 15, found 01 hr 23 min ago." Static elements 308d and 308f remain unchanged in populated dynamic advertisement creative 1500, with static element 308d remaining as fourth element 208 and static element 308f remaining as sixth element 212 of advertisement 200 shown in FIG. 2.

In step 1414, the user is enabled to interact with the populated dynamic advertisement creative to communicate with an advertiser website. For example, as shown in FIG. 13, user 1332 may view populated dynamic advertisement creative 1334 displayed on web page 106 at computer 1302. If user 1332 is interested in the product and/or service advertised by dynamic advertisement creative 1334, user 1332 may interact with dynamic advertisement creative 1334, such as by clicking on dynamic advertisement creative 1334 (e.g., using a mouse pointer device). By interacting with dynamic advertisement creative 1334, web browser 1314 may transmit a seventh communication signal 1330 from computer 1302 through network 1304 to advertiser server 1310. Seventh communication signal 1330 includes a request for an advertiser-related web page associated with dynamic advertisement creative 1334, such as advertiser web page 1318 hosted by advertiser server 1310. Advertiser server 1310 receives seventh communication signal 1330. Advertiser server 1310 may be a server of the advertiser associated with dynamic advertisement creative 1334, for example. Advertiser web page 1318 may be transmitted to computer 102 for display, and may provide further information regarding products and/or services of the advertiser.

Note that in an embodiment, the URL address for advertiser web page 1318 may be a dynamic element 406 of a dynamic advertisement creative 404. Thus, for each variation of dynamic advertisement creative 404 according to a different combination of dynamic data, a different URL address may be associated with dynamic advertisement creative 404. In this manner, a different advertiser web page may be accessed for each variation of dynamic advertisement creative 404.

Furthermore, note that although flowchart 1400 is described above with dynamic advertisement creative 404 being dynamically populated with data (step 1412) after being transmitted to the user (step 1410), in another embodiment, dynamic advertisement creative 404 may be dynamically populated with data prior to being transmitted to the user. For example, dynamic advertisement creative 404 may be dynamically populated with data at ad server 1308 in an embodiment.

Example Computer System Implementations

Note that dynamic creative management tool 402 shown in FIG. 4 may include hardware, software, firmware, or any combination thereof to perform its functions. For example, any one or more of ad loader 602 (FIG. 6), ad decompiler 604 (FIG. 6), dynamic element selector 606 (FIGS. 6 and 8), dynamic ad generator 608 (FIGS. 6 and 12), ad compiler 1202 (FIG. 12), schema generator 1204 (FIG. 12), and ad call routine generator 1206 (FIG. 12) may include computer code configured to be executed in one or more processors. Alternatively or additionally, any one or more of ad loader 602, ad decompiler 604, dynamic element selector 606, dynamic ad generator 608, ad compiler 1202, schema generator 1204, and ad call routine generator 1206 may include hardware logic/electrical circuitry.

In an embodiment, ad loader 602, ad decompiler 604, dynamic element selector 606, dynamic ad generator 608, ad compiler 1202, schema generator 1204, and/or ad call routine generator 1206 may implemented in one or more computers, including a personal computer, a mobile computer (e.g., a laptop computer, a notebook computer, a handheld computer such as a personal digital assistant (PDA) or a Palm™ device, etc.), or a workstation. These example devices are provided herein purposes of illustration, and are not intended to be limiting. Embodiments of the present invention may be implemented in further types of devices, as would be known to persons skilled in the relevant art(s).

Devices in which embodiments may be implemented may include storage, such as storage drives, memory devices, and further types of computer-readable media. Examples of such computer-readable media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, as well as other media such as flash memory cards, digital video discs, RAM devices, ROM devices, and the like. Such computer-readable media may store program modules that include logic for implementing ad loader 602, ad decompiler 604, dynamic element selector 606, dynamic ad generator 608, ad compiler 1202, schema generator 1204, and/or ad call routine generator 1206, flowchart 500 of FIG. 5, and/or flowchart 1400 of FIG. 14, and/or further embodiments of the present invention described herein. Embodiments of the invention are directed to computer program products comprising such logic (e.g., in the form of software) stored on any computer useable medium. Such software, when executed in a processing unit (that includes one or more data processing devices), causes a device to operate as described herein.

CONCLUSION

While various embodiments of the present invention have been described above, it should be understood that they have been presented by way of example only, and not limitation. It will be apparent to persons skilled in the relevant art(s) that various changes in form and details may be made to the embodiments described above without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method, comprising:

receiving an advertisement creative at least one processor;

decompiling the advertisement creative into a plurality of static elements using the at least one processor by parsing the received advertisement creative to identify the plurality of static elements, the static elements each including respective fixed information;

enabling a user to select a static element of the plurality of static elements to be converted into a first dynamic element, said enabling including providing a user interface with which the user is enabled to interact to select the static element to be converted into the first dynamic element and that indicates at least one static element of the plurality of static elements not selected to be converted into a dynamic element;

generating an unpopulated dynamic advertisement creative that is an unpopulated dynamic version of the received advertisement creative, the unpopulated dynamic advertisement creative including a placeholder corresponding to the selected static element and including the at least one static element indicated as not selected to be converted into a dynamic element, the placeholder configured to be dynamically populated with data;

generating a schema that identifies one or more dynamic elements of the unpopulated dynamic advertisement creative including the first dynamic element, and that identifies a type of data used to populate one or more placeholders of the unpopulated dynamic advertisement creative including the placeholder; and generating a call routine using at least one processor that is configured to be loadable with data defined according to the generated schema in response to a request for an advertisement to display in a web page, is configured to be transmitted to a web browser in response to the request, and is configured to be executed by the web browser to call the unpopulated dynamic advertisement creative to enable the one or more placeholders of the unpopulated dynamic advertisement creative to be populated with data loaded in the call routine.

2. The method of claim 1, wherein said decompiling comprises:
   decompiling the advertisement creative into one or more static textual elements and one or more static graphical elements.

3. The method of claim 1, wherein said enabling comprises:
   enabling the user to select multiple static elements of the plurality of static elements to be converted into corresponding dynamic elements; and
   wherein said generating comprises:
   generating the unpopulated dynamic advertisement creative to include a plurality of placeholders that correspond to the selected multiple static elements, each placeholder being configured to be dynamically populated with corresponding data.

4. The method of claim 1, further comprising:
   receiving a request from a web browser for an advertisement to display in a web page;
   loading the call routine with selected data defined according to the generated schema; and
   transmitting the call routine to the web browser for execution to enable the unpopulated dynamic advertisement creative to be requested, to enable the placeholder to be populated with the loaded selected data after the unpopulated dynamic advertisement creative is received, and to enable an advertisement formed by populating the placeholder of the unpopulated dynamic advertisement creative with the loaded selected data to be displayed.

5. The method of claim 1, further comprising:
   selecting the data to populate the placeholder based on an attribute of a user, a page, a computer system of a user, a time of the day, and/or other serving context.

6. A dynamic creative management tool, comprising:
   at least one processor;
   an advertisement decompiler configured to use the at least one processor to parse a received advertisement creative to identify a plurality of static elements of the received advertisement creative, each of the plurality of static elements including respective fixed information, to decompile the received advertisement creative into the plurality of static elements;
   a dynamic element selector configured to enable a user to select a static element of the plurality of static elements to be converted into a first dynamic element, the dynamic element selector being configured to provide a user interface with which the user is enabled to interact to select the static element to be converted into the first dynamic element and that indicates at least one static element of the plurality of static elements not selected to be converted into a dynamic element; and
   a dynamic advertisement generator configured to generate an unpopulated dynamic advertisement creative that is an unpopulated dynamic version of the received advertisement creative, the unpopulated dynamic advertisement creative including a placeholder corresponding to the selected static element, the at least one static element indicated as not selected to be converted into a dynamic element;
   the dynamic advertisement generator including
      an advertisement compiler configured to generate the unpopulated dynamic advertisement creative,
      a schema generator configured to generate a schema that identifies one or more dynamic elements of the unpopulated dynamic advertisement creative including the first dynamic element, and that identifies a type of data used to populate one or more placeholders of the unpopulated dynamic advertisement creative including the placeholder, and
      an advertisement call routine generator configured to generate a call routine that is configured to be loadable with data defined according to the generated schema in response to a request for an advertisement to display in a web page, is configured to be transmitted to a web browser in response to the request, and is configured to be executed by the web browser to call the unpopulated dynamic advertisement creative to enable the one or more placeholders of the unpopulated dynamic advertisement creative to be populated with data loaded in the call routine.

7. The dynamic creative management tool of claim 6, wherein the user interface is configured to enable the user to select multiple static elements of the plurality of static elements to be converted into corresponding dynamic elements; and
   wherein the dynamic advertisement generator is configured to generate the unpopulated dynamic advertisement creative to include a plurality of placeholders that correspond to the selected multiple static elements, each placeholder being configured to be dynamically populated with corresponding data.

8. A computer program product comprising a tangible computer-readable medium having computer program logic recorded thereon for enabling a processing unit to generate unpopulated dynamic advertisement creatives, comprising:
   first computer program logic means for enabling the processing unit to decompile a received advertisement creative into a plurality of static elements by parsing the received advertisement creative to identify the plurality of static elements that include respective fixed information;
   second computer program logic means for enabling the processing unit to enable a user to select a static element of the plurality of static elements to be converted into a first dynamic element, the second computer program logic means being configured to enable the processing unit to provide a user interface with which the user is enabled to interact to select the static element to be converted into the first dynamic element and that indicates at least one static element of the plurality of static elements not selected to be converted into a dynamic element; and
   third computer program logic means for enabling the processing unit to generate an unpopulated dynamic advertisement creative that is a dynamic version of the received advertisement creative, the unpopulated dynamic advertisement creative including a placeholder corresponding to the selected static element and including the at least one static element indicated as not selected to be converted into a dynamic element, the placeholder configured to be dynamically populated with data;
   wherein the third computer program logic means comprises
      fourth computer program logic means for enabling the processing unit to generate a schema that identifies one or more dynamic elements of the unpopulated dynamic advertisement creative including the first dynamic element, and that identifies a type of data used to populate one or more placeholders of the unpopulated dynamic advertisement creative including the placeholder, and fifth computer program logic means for enabling the processing unit to generate a call routine that is configured to be loadable with data defined according to the generated schema in response to a request for an advertisement to display in a web page, is configured to be transmitted to a web browser in response to the request, and is configured to be executed by the web browser to call the unpopulated dynamic advertisement creative to enable the one or more placeholders of the unpopulated dynamic advertisement creative to be populated with data loaded in the call routine.

9. The computer program product of claim 8, wherein said first computer program logic means comprises:
sixth computer program logic means for enabling the processing unit to decompile the received advertisement creative into one or more static textual elements and one or more static graphical elements.

10. The computer program product of claim 8, wherein said second computer program logic means comprises:
sixth computer program logic means for enabling the processing unit to enable the user to select multiple static elements of the plurality of static elements to be converted into corresponding dynamic elements; and
wherein said third computer program logic means comprises:
seventh computer program logic means for enabling the processing unit to generate the unpopulated dynamic advertisement creative to include a plurality of placeholders that correspond to the selected multiple static elements, each placeholder being configured to be dynamically populated with corresponding data.

11. The computer program product of claim 8, further comprising:
sixth computer program logic means for enabling the processing unit to receive a request from a web browser for an advertisement to display in a web page;
seventh computer program logic means for enabling the processing unit to load the call routine with selected data defined according to the generated schema; and
eighth computer program logic means for enabling the processing unit to transmit the call routine to the web browser for execution to enable the unpopulated dynamic advertisement creative to be requested, to enable the placeholder to be populated with the loaded selected data after the unpopulated dynamic advertisement creative is received, and to enable the unpopulated dynamic advertisement creative to be displayed.

12. The computer program product of claim 8, further comprising:
sixth computer program logic means for enabling the processing unit to select the data to populate the placeholder based at least on an attribute of a user, a page, a computer system of a user, a time of the day, and/or other serving context.

* * * * *

UNITED STATES PATENT AND TRADEMARK OFFICE
CERTIFICATE OF CORRECTION

| | | |
|---|---|---|
| PATENT NO. | : 7,941,340 B2 | Page 1 of 1 |
| APPLICATION NO. | : 12/242645 | |
| DATED | : May 10, 2011 | |
| INVENTOR(S) | : Marcus Doemling et al. | |

It is certified that error appears in the above-identified patent and that said Letters Patent is hereby corrected as shown below:

In column 18, line 29, in claim 1, delete "at least" and insert -- at at least --, therefor.

Signed and Sealed this
Ninth Day of August, 2011

David J. Kappos
*Director of the United States Patent and Trademark Office*